United States Patent
Whalen, Jr. et al.

[11] Patent Number: 6,029,889
[45] Date of Patent: Feb. 29, 2000

[54] FIREFIGHTER ACCOUNTABILITY APPARATUS AND METHOD

[76] Inventors: Paul Whalen, Jr., R.R. #3 Box 300, Cornish, N.H. 03745; Gary Chilton, HC 64 Box, Meriden, N.H. 03770; Nathan Cass, P.O. Box 13, Rte. 120, Cornish Flat, N.H. 03746

[21] Appl. No.: 08/960,813

[22] Filed: Oct. 30, 1997

[51] Int. Cl.[7] .................................................. G06K 5/00
[52] U.S. Cl. .................... 235/380; 235/375; 235/462.13; 235/470
[58] Field of Search .................................. 235/375, 377, 235/380, 382, 385, 454, 462.13, 462.43, 462.45, 462.46, 470, 472.01, 472.02; 340/529, 573.1, 825.3, 825.31; 382/100

[56] References Cited

U.S. PATENT DOCUMENTS

| | | | |
|---|---|---|---|
| 4,633,231 | 12/1986 | Kilian | 340/539 |
| 5,157,378 | 10/1992 | Stumberg et al. | 340/539 X |
| 5,497,141 | 3/1996 | Coles et al. | 235/377 X |
| 5,596,652 | 1/1997 | Piatek et al. | 382/115 |
| 5,638,273 | 6/1997 | Coiner et al. | 364/424.04 |
| 5,640,002 | 6/1997 | Ruppert et al. | 235/472.02 |
| 5,656,804 | 8/1997 | Barkan et al. | 235/470.01 |

*Primary Examiner*—Donald Hajec
*Assistant Examiner*—Jared J. Fureman
*Attorney, Agent, or Firm*—Michael J. Persson; William B. Ritchie

[57] ABSTRACT

An accountability system for keeping track of firefighters at a fire scene. The system includes an identification card containing specific personal information represented by a bar code. A bar code reader is adapted to read the bar code and to communicate the data from the bar code to a computer. A data entry device is connected to the computer and is adapted to allow entry of additional data by a user. The computer is in communication with the bar code reader and data entry device and is programmed to process data received from the bar code reader and data entry device and provide a number of predetermined outputs, a display, and an alarm adapted to provide an alert to the Accountability Officer corresponding to a predetermined output. In the preferred embodiment, the computer is programmed to calculate the elapsed time after the bar code reader reads the identification card, and to trigger an alarm when the elapsed time exceeds a predetermined maximum safe breathing time. The method includes the steps of reading a bar code representing a predetermined set of data, storing the data in a memory of a computer, entering additional information pertaining to the firefighter, calculating the time following the reading step, and sounding an alarm when said time exceeds a predetermined time. In other embodiments, the additional steps of communicating data to other computers, and of entering equipment and scene information are also included.

16 Claims, 3 Drawing Sheets

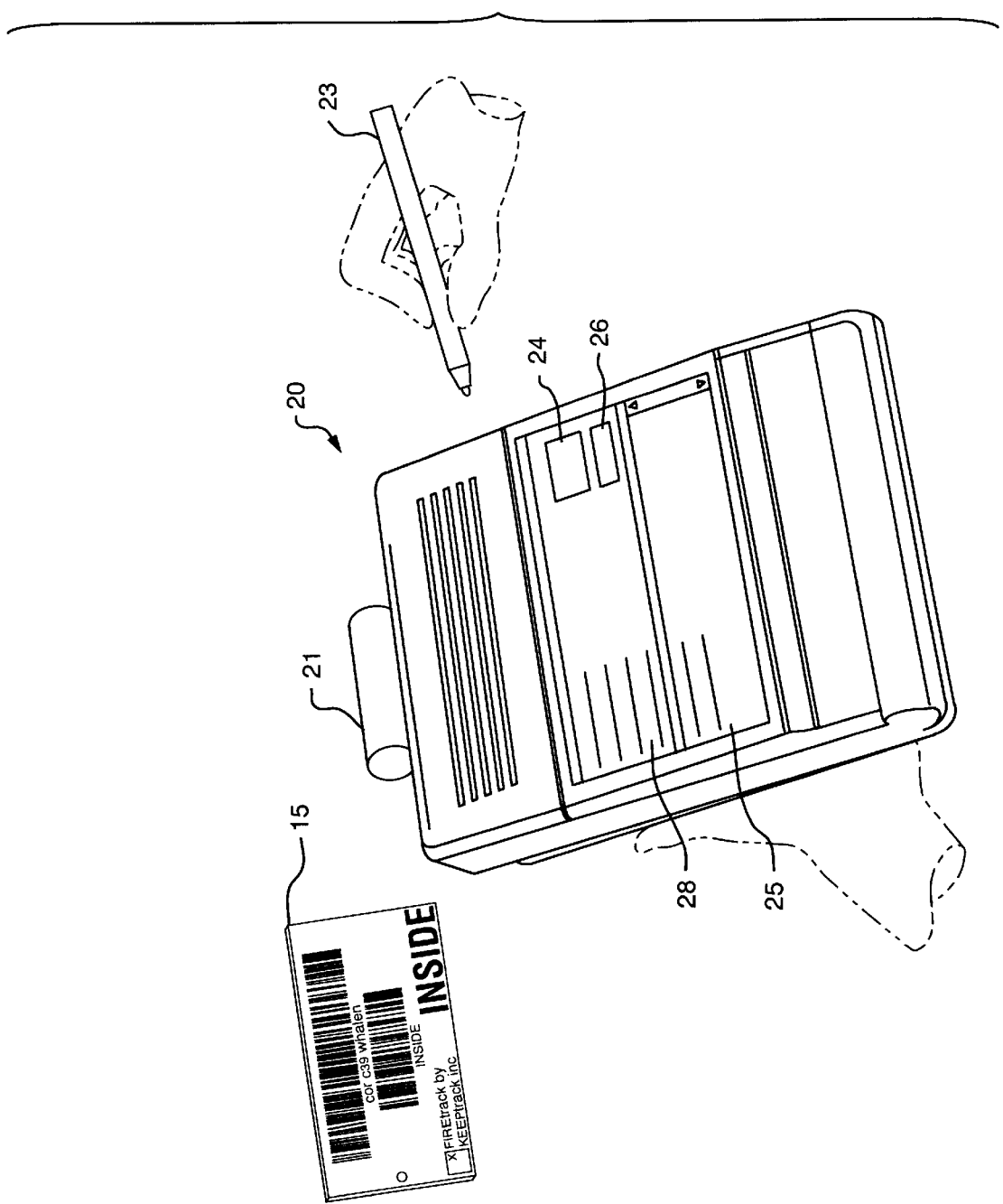

FIREFIGHTER ACCOUNTABILITY APPARATUS AND METHOD

FIELD OF THE INVENTION

The present invention relates to the field of accountability systems and, in particular, to methods and apparatus for accounting for firefighters at a fire scene.

BACKGROUND OF THE INVENTION

Fire scenes can be chaotic places with many firefighters working together to extinguish the flames and save the lives of people trapped inside of the burning structure. This chaos is magnified when multiple fire and rescue companies are called to the fire scene and where burning structures are entered from different locations. In the course of their duties, firefighters may encounter trouble and be in need of rescue themselves. However, in the chaos at the scene of a fire, it is easy to lose track of firefighters resulting in firefighters being left inside the burning structure without oxygen or in other firefighters risking their lives to save a comrade who has escaped the structure through another location.

Traditionally, firefighter accountability has been left to an Accountability Officer who monitors the ingress and egress of firefighters from the scene with a chalkboard or grease pencil board. This method requires the Accountability Officer to write the names of the firefighters, whether they are wearing a breathing apparatus, what time they entered the "hot zone" and where in the burning structure they are working. Firefighters must then report back to the Accountability Officer when they exit the structure so that they are accounted for. If a firefighter does not return within a set period of time, it is the responsibility of the Accountability Officer to send a rescue team to the area where the firefighter was assigned to search for, and rescue, the missing firefighter.

This method has a number of drawbacks. First, the time spent obtaining and writing information from the firefighters takes time away from fire fighting and rescue efforts. This factor is magnified when many firefighters arrive on the scene at the same time. In addition, the need for a separate Accountability Officer for each fire company at the scene reduces the total number of people fighting the fire. Second, the chaos of a fire scene does not lend itself to the requirement that an Accountability Officer check his watch against the information on the board and calculate elapsed time versus the breathing time available from a given breathing apparatus. This is magnified when there are many firefighters at the scene and many critical times to calculate, making it more likely that someone will be overlooked. Third, this process is location specific and requires the firefighter to report either to his specific Accountability Officer or to another officer who must subsequently try to radio the proper Accountability Officer with the information. If the firefighter does not report or no message is received, there is the possibility that other firefighters will needlessly risk their lives trying to save the "missing" firefighter. Finally, should a firefighter be hurt in the course of his duties, this method does not include any way of immediately providing important medical information to personnel at the scene.

Other accountability systems have been developed to overcome some of the drawbacks of the traditional method. One such system is marketed by Clemens Industries, Inc. of Ashton, Md. under the name PAS-V™. This system includes a series of individual personal information cards and plastic tags attached to collector rings which are hung on a color coded binder at a fire scene. Using this system, a single Accountability Officer collects tags from each firefighter as they enter the fire scene. The information cards include important medical and personal information and the plastic tags are color coded to coincide with the type of service provided (i.e. red for engine companies, green for special services, orange for emergency medical services etc.). The Accountability Officer hangs these tags on the binder in a location corresponding with the particular color code and the particular company to which the firefighter belongs. In addition, the system includes specific tags for certain pieces of equipment which are also "tagged in". Once a firefighter leaves the fire scene, he retrieves his tag and the tag for any equipment that he may have tagged in. If any tags remain on the binder, the Accountability Officer knows that the firefighter and/or equipment is still "on scene". In this system, an alarm is sounded either every twenty minutes or after a significant event takes place, after which every firefighter on scene must report back to the Accountability Officer. If a firefighter does not report back, a rescue team is sent.

This system overcomes some of the drawbacks of the traditional system. It requires only one Accountability Officer for a given location and lessens the amount of time required to log firefighters at the scene of the fire. In addition, the regrouping of firefighters either every twenty minutes, or after a significant event takes place, eliminates the need for the Accountability Officer to keep track of a number of critical times, lessening the chance that a firefighter will be forgotten. Finally, the provision of important medical information on the information cards allows rescue workers to immediately treat an injured firefighter without fear of drug allergies or other adverse effects.

However, despite overcoming many of the drawbacks of the traditional system, this system has significant drawbacks of its own. First, the simultaneous reporting to the Accountability Officer by all firefighters, regardless of how long they have been inside a structure or whether they have employed a breathing apparatus, unnecessarily detracts from what would otherwise be time spent fighting the fire and saving lives. Second, as all firefighters must check in at the same time, the Accountability Officer is inundated at these times, creating a higher probability that a firefighter who has escaped the fire will be assumed missing or that a missing firefighter will overlooked. Third, this system does not solve the problem of reporting to Accountability Officers at different locations and, in fact, the simultaneous reporting required by the system exacerbates this problem by the aforementioned inundation of the Accountability Officer. Finally, neither this system nor the traditional system includes any way of maintaining a record of the fire scene for future review.

The applicant knows of no system that allows a single Accountability Officer to monitor firefighters from different fire companies, that eliminates the need for the Accountability Officer to keep track of the time spent by a firefighter inside of a burning structure, does not unnecessarily remove firefighters from the fire scene to report the Accountability Officer, provides an immediate update of the status of firefighters reporting to different locations, and provides important medical and personal information to rescue personnel at the fire scene. Likewise, the applicant knows of no system that allows a record of a fire scene to be kept for future review and training.

SUMMARY OF THE INVENTION

The present invention is an accountability system for keeping track of firefighters at a fire scene. In its most basic form, the system of the present invention comprises an identification card containing specific personal information represented by a bar code, a bar code reader adapted to read the bar code and to communicate the data from the bar code to a computer, a data entry means adapted to allow entry of additional data by a user, a computer, in communication with the bar code reader and data entry means, programmed to process data received from the bar code reader and data entry means and provide a number of predetermined outputs, a display adapted to provide a visual output to a user, and an alarm adapted to provide an alert to the Accountability Officer corresponding a predetermined output.

In operation, the bar code reader reads the bar code from the identification card and communicates the set of data to the computer, the computer provides an output to the display which presents the data to the user. The user then enters additional data through the data entry means which the computer processes and provides an output to the display. The computer also provides an output to the alarm causing the alarm to sound upon the occurance of a predetermined event.

In the preferred embodiment of the invention, the computer is programmed to calculate the elapsed time after the bar code reader reads the identification card and to trigger an alarm when the elapsed time exceeds a predetermined maximum safe breathing time. The preferred apparatus keeps track of location data, medical data, and equipment data and includes a communicator which allows data from the computer to be shared with computers at different locations, either through radio frequency transmission or through cellular telecommunications data transfer. Finally, the preferred system combines the communicator, the bar code reader, the computer, the data entry means, the display, and the alarm into a single apparatus.

The present invention also includes a method for keeping track of firefighters. In its most basic form, this method comprises the steps of reading a bar code representing a predetermined set of data, storing the data in a memory of a computer, entering additional information pertaining to the firefighter, calculating the time following the reading step, and sounding an alarm when said time exceeds a predetermined time. However, in other embodiments, the additional steps of communicating data to other computers, entering equipment and scene information are also included.

Therefore, it is an aspect of the invention to provide an apparatus and method of effectively keeping track of the location of a person.

It is another aspect of the invention to provide an apparatus and method of effectively keeping track of the time a person has spent in a given location.

It is another aspect of the invention to provide an apparatus and method of effectively keeping track of important medical information.

It is another aspect of the invention to provide an apparatus and method of effectively keeping track of equipment at a given location.

It is another aspect of the invention to provide an apparatus and method of effectively transmitting personnel, time and equipment information to a number of locations.

It is a still further aspect of the invention to provide an apparatus and method of accounting for firefighters that provides a record of a fire scene to be kept for future review and training.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 3 is an isometric view of the identification card of FIG. 2 in the process of being read by the preferred apparatus of the system of the present invention.

DETAILED DESCRIPTION OF THE DRAWINGS

The present invention is a computer assisted firefighter accountability system that allows fire departments to more accurately keep track of personnel at a fire scene while maximizing the period of time spent by firefighters fighting the fire and saving lives.

Figure 1:
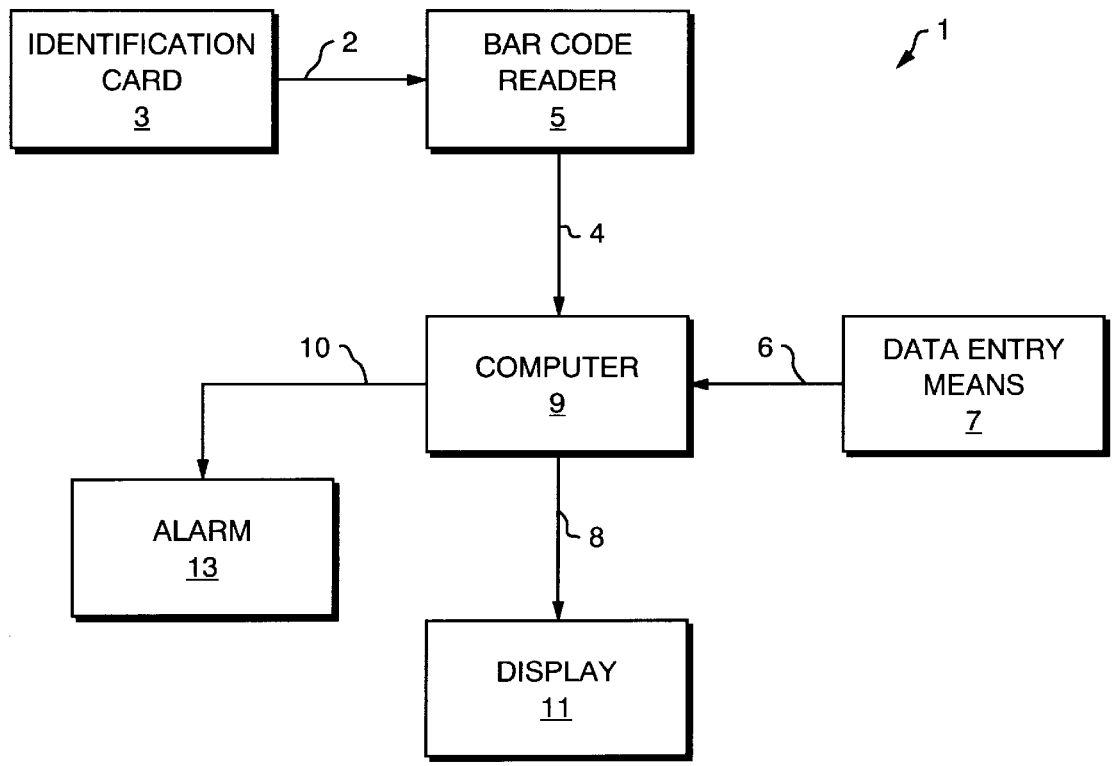
FIG. 1 is a block diagram of the elements of the basic embodiment of the system of the present invention.

Referring first to FIG. 1, a block diagram of the basic embodiment of the system of the present invention is shown. The basic embodiment of the system 1 comprises an identification card 3, a bar code reader 5, data entry means 7, a computer 9, a display 11, and an alarm 13. The arrows between each block indicate the flow of information from each system element.

Identification card 3 is a bar-coded tag issued to each firefighter and kept with the firefighter at all times. The identification card 3 contains bar-coded information that may be customized for individual company needs, however, all will contain unique personnel data pertaining to the firefighter. This data generally would include information such as the firefighter's name and fire company and, in some embodiments, would also include detailed medical information, contact names and phone numbers, professional certifications and other information relevant to a firefighter at a fire scene. In addition, as the identification card 3 is not relinquished by the firefighter at the scene, in some embodiments of the invention the card is made of a fireproof material and/or includes a computerized tracking device, similar to the vehicle tracking system sold under the trademark LO-JACK. These additional features are designed to allow a firefighter to be properly identified should his body become unrecognizably burned and to provide information to medical personnel necessary to properly treat the injured firefighter.

Bar code reader 5 is adapted to read the information embodied in the bar codes printed on the identification tags 3 and to electronically transmit this information to the computer 9. Bar code reader 5 may be any commercially available bar code reader having the ability scan and to transmit scanned information to a computer for processing. In the preferred embodiment, bar code reader 5 is a hand held unit, but a stationary unit could also be utilized to achieve similar results.

Data entry means 7 is adapted to allow a user to provide additional information to the computer which is not part of the information found on the information card. This additional information may include the location where the firefighter will be at the fire scene, on what floor the firefighter will be working in a burning structure, whether a firefighter is wearing a breathing apparatus, what specific type of breathing apparatus is used, maximum safe breathing time of a given breathing apparatus, whether a firefighter is wearing any special protective clothing, whether there are any special scene conditions such as adverse weather, toxic or explosive chemicals etc., what equipment is on the scene, the amount and type of water sources at the scene, and any other information relevant either to firefighter accountability or fire scene re-creation. In the preferred embodiment of the invention, data entry means 8 is a pen-based, menu driven portable computer terminal. However, other art recognized data entry means, such as keyboards, magnetic touch pads, voice recognition terminals, etc., that allow additional data to be entered and transmitted to the computer 9 may be used to achieve similar results.

Computer 9 is adapted to receive the outputs from the bar code reader 5 and from the data entry means 7, to process these outputs, and to send processed outputs to the display 11 and alarm 13. In the preferred embodiment of the invention, computer 9 is a 486-type microprocessor housed inside of a hand held apparatus. However, other computers having the ability to accept the outputs from the bar code reader 5 and data entry means 7, to process and store data, and to generate outputs to the display 11 and alarm 13 may be used to achieve similar results.

Display 11 is adapted to receive an output from computer 9 and to provide a visual image to the user. In the preferred embodiment, display 11 is a backlit liquid crystal display that also presents a graphical user interface that serves as the data entry means 7. However, display 11 may be a cathode ray tube, unlit liquid crystal display or simply a series of lights that indicate whether a given firefighter is still "on scene".

Alarm 13 is adapted to receive a signal from computer 9 corresponding to a certain output and to prompt the user to take some sort of action. In the preferred embodiment of the invention, alarm 13 is an audible alarm that sounds when a firefighter has remained in the "hot zone" of a fire scene beyond the maximum safe breathing time of his breathing apparatus. However, alarm 13 may take the form of a flashing light, a vibrating box worn by the Accountability Officer, or any other art recognized means of getting the attention of the Officer to prompt him to take action. Similarly, alarm 13 may be triggered by events other than the length of time spent by a firefighter in the "hot zone", such as a low water warning for a tanker truck, a break in communications between the computer 9 and a computer at another location, or any other event that would be of importance to an Accountability Officer at a fire scene.

In operation, the Accountability Officer will set up a command post at the fire scene and scan 2 the tags of each firefighter as they enter the scene. The bar code reader 5 will simultaneously transfer 4 the bar code information to the computer 9, which processes this information and outputs 8 a visual representation of the information to the display 11. The Accountability Officer may then enter additional information into data entry means 7, which transfers 6 this additional information to the computer 9 for processing. The computer 9 keeps track of the elapsed time between scanning and compares this to the information entered into through the data entry means 7. If the elapsed time exceeds a predetermined threshold, then a signal 10 is sent to alarm 13 and the Accountability Officer is prompted to take appropriate action.

Figure 2:
FIG. 2 is a front view of an identification card utilized in the preferred embodiment of the system of the present invention.

Referring now to FIGS. 2 & 3, the preferred embodiment of the invention is described in detail. The preferred embodiment of the present invention utilizes a pen-based, menu driven scanning portable computer terminal to read the bar-coded personnel information and keep track of personnel location, time duration and ancillary fire ground information. This terminal is of the type similar to the PPT 4600 series terminals available from Symbol Technologies of Holtsville, N.Y., and integrates the bar code scanner, computer, display, data entry means and alarm into one hand held unit.

As shown in FIG. 2, a bar-coded personnel "ID" tag 15 is issued to each person. Tag 15 includes two bar codes 17, 19 that each provide different information. Bar code 17 provides the name of the firefighter, the firefighter's fire company and any important medical information. Bar code 19 provides the name and phone number of a person to contact in case of an injury.

As shown in FIG. 3, as the firefighter enters the "hot zone" at a fire scene, the Accountability Officer points bar code reader 21, integral to terminal 20, in the direction of his tag 15 causing his tag 15 to be automatically scanned by bar code reader 21. The Accountability Officer then records the location where the firefighter will be working and whether the firefighter will be wearing a breathing apparatus by using pen 23 to manipulate the interactive display 25. The Accountability Officer may then use pen 23 to choose the options icon 28 on interactive display 25 to record other information, as discussed above, or may choose the GO button 24 which begins the running of elapsed time for the particular firefighter. After a firefighter has been inside of the burning structure for a predetermined amount of time, generally that amount of time considered to be safe for a firefighter to wear breathing apparatus, an audible and visual warning is given by the terminal 25 that this particular firefighter has gone past the "safe" time. If, at the time of data entry, the firefighter indicates he is not entering the structure and thus does not require breathing apparatus, the elapsed time is calculated but no alarm will be indicated. Once a firefighter exits the structure and returns to the Accountability Officer, the Officer again uses pen 23 to choose the STOP button 26 which halts the running of the elapsed time and prevents the alarm from being activated.

In addition to breathing apparatus and floor information, the OPTIONS button 28 allows the terminal 25 to also give the operator the option of entering information about general scene conditions, equipment on the scene and amount of water used. This information is important for future analysis of the fire scene for training purposes, for scene recreation in the event of an accident, for inventory control purposes, and for future planning such as new equipment budgeting. In the case of equipment on the scene, the terminal 25 also has the option of reading bar coded tags corresponding to these pieces of equipment and storing this information in a separate inventory control program within the computer.

The preferred embodiment of the invention also includes a communicator that allows collected data to be transmitted to other computers, providing key personnel current personnel information regardless of location. Communication may be through radio frequency (RF) or cellular telecommunications data transfer between computers with the actual type of transferring protocol being based upon the needs of the user. Typically, RF is used in suburban or metropolitan areas, while cellular is more appealing to smaller departments because of reduced costs. With computers able to communicate between each other, two or more points-of-entry into the "hot zones" can be transmitted to one central controlling computer/location. This, in turn, provides the Accountability Officer with a complete and up-to-date information about personnel in the "hot zone" and prevents situations where firefighters are presumed missing when they have actually exited via a different location. Information may even be transmitted back to a dispatch center, allowing close observation of personnel in a more controlled environment.

The computerized entry and storage of data at the fire scene also allows this data to be easily analyzed. At any point during the fire, the Accountability Officer may request the computer to display summary data including firefighters that have entered/exited the "hot zone", firefighters still in the "hot zone" and their location, elapsed time for each firefighter in the "hot zone", elapsed time from the first tag scanned, firefighter medical alert warnings, important phone numbers, amount of water used, and equipment on the scene. At the termination of the incident, all data accumulated may be transmitted to a central computer which will collect all scene information. This information may be manipulated in a number of ways, including generating reports with information specific to a particular department and generating averages for all departments reporting. This statistical information may then be used by a particular department to gauge their effectiveness, to prepare training programs or to justify the purchase of additional equipment.

The present invention solves the problems inherent in other accountability systems and offers additional advantages over these systems. Firefighter tags can be scanned quickly allowing the firefighter faster access into an incident. The system requires only one Accountability Officer to gather more information and allows this information to be gathered quicker and more accurately than systems currently in operation. The system of the present invention eliminates the need for the Accountability Officer to keep track of the time spent by a firefighter inside of a burning structure and does not unnecessarily remove firefighters from the fire scene to report the Accountability Officer. Further, the system provides an immediate update of the status of firefighters reporting to different locations and provides important medical and personal information to rescue personnel at the fire scene. Finally, the system of the present invention allows a record of a fire scene to be kept and analyzed in order to enhance the ability of fire departments to safely and effectively fight fires and save lives.

Although the present invention has been described in considerable detail with reference no to certain preferred versions thereof, other versions would be readily apparent to those of ordinary skill in the art. Therefore, the spirit and scope of the appended claims should not be limited to the description of the preferred versions contained herein.

What is claimed is:

1. An accountability system comprising:
   an identification card having a bar code representing a predetermined set of data;
   a bar code reader adapted to read said bar code and to communicate said set of data from said bar code;
   data entry means adapted to allow entry of additional data by a user and to communicate said data, wherein said additional data comprises breathing apparatus data;
   a computer in communication with said bar code reader and said data entry means, said computer being programmed to process the data received from said bar code reader and said data entry means and to provide a plurality of predetermined outputs, wherein said processing of the data comprises calculating an elapsed time, and wherein at least one of said predetermined outputs is a warning provided when said elapsed time exceeds a predetermined maximum safe breathing time;
   a display in communication with said computer and adapted to provide a visual output to a user; and
   an alarm in communication with said computer and adapted to provide a warning corresponding to one of said plurality of predetermined outputs;
   wherein said bar code reader reads said bar code from said identification card and communicates said set of data to said computer, said computer provides an output to said display which presents said data to said user, said user enters said additional data through said data entry means, said computer processes said additional data and provides an output to said display, and said computer calculates an elapsed time and provides an output to said alarm causing said alarm to provide a warning when said elapsed time exceeds a predetermined maximum safe breathing time.

2. The accountability system as claimed in claim 1 wherein said additional data comprises location data.

3. The accountability system as claimed in claim 1 wherein said predetermined set of data comprises medical data.

4. The accountability system as claimed in claim 1 wherein said predetermined set of data comprises equipment data.

5. The accountability system as claimed in claim 1 further comprising a communicator adapted to allow data from said computer to be shared with a computer at a different location.

6. The accountability system as claimed in claim 5 wherein said communicator communicates through radio frequency transmission.

7. The accountability system as claimed in claim 5 wherein said communicator communicates through cellular telecommunications data transfer.

8. The accountability system as claimed in claim 5 wherein said communicator, said bar code reader, said computer, said data entry means, said display, and said alarm are combined in a single apparatus.

9. The accountability system as claimed in claim 8 wherein said display is a backlit liquid crystal display.

10. The accountability system as claimed in claim 9 wherein said data entry means is integrated within said display.

11. The accountability system as claimed in claim 1 wherein said warning is an audible warning.

12. The accountability system as claimed in claim 1 wherein said warning is a visual warning.

13. A method of accounting for a plurality of firefighters at a fire scene comprising the steps of:
   reading a bar code representing a predetermined set of data;
   storing said data in a memory of a computer;
   entering additional information pertaining to one of said plurality of firefighters, said additional information comprising breathing apparatus information;
   calculating a time following said reading step;
   comparing said time with a predetermined maximum safe breathing time; and
   sounding an alarm when said time exceeds said predetermined maximum safe breathing time.

14. The method as claimed in claim 13 further comprising the step of communicating said data and said additional information to at least one other computer.

15. The method as claimed in claim 13 further comprising the step of entering equipment information.

16. The method as claimed in claim 13 further comprising the step of entering scene information.

* * * * *